US010675691B2

(12) United States Patent
Most et al.

(10) Patent No.: US 10,675,691 B2
(45) Date of Patent: Jun. 9, 2020

(54) METHOD FOR MACHINING AN ATTACHMENT FLANGE OF AN AIRCRAFT TURBOMACHINE CASE

(71) Applicant: SAFRAN AIRCRAFT ENGINES, Paris (FR)

(72) Inventors: Vincent Bernard Serge Most, Le Plessis Robinson (FR); Hubert Jean Marie Fabre, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 117 days.

(21) Appl. No.: 15/797,041

(22) Filed: Oct. 30, 2017

(65) Prior Publication Data
US 2018/0126468 A1   May 10, 2018

(30) Foreign Application Priority Data

Nov. 4, 2016  (FR) ...................................... 16 60700

(51) Int. Cl.
| | | |
|---|---|---|
| *B23C 3/12* | (2006.01) | |
| *B23Q 35/10* | (2006.01) | |
| *B23Q 35/26* | (2006.01) | |
| *F01D 25/24* | (2006.01) | |
| *B23C 1/16* | (2006.01) | |

(Continued)

(52) U.S. Cl.
CPC ................. *B23C 3/12* (2013.01); *B23C 1/16* (2013.01); *B23C 3/00* (2013.01); *B23Q 35/104* (2013.01); *B23Q 35/26* (2013.01); *B23Q 35/28* (2013.01); *F01D 25/243* (2013.01); *B23C 2215/04* (2013.01); *B23C 2220/40* (2013.01);

(Continued)

(58) Field of Classification Search
CPC .... B23C 3/12; B23C 3/00; B23C 1/16; B23Q 35/28; B23Q 35/26; B23Q 35/104; F01D 25/243; F05D 2230/53
See application file for complete search history.

(56) References Cited

U.S. PATENT DOCUMENTS

2016/0184905 A1* 6/2016 Tanaka ...................... B23C 3/12
409/138

FOREIGN PATENT DOCUMENTS

| DE | 1 143 992    | 2/1963 |
|----|--------------|--------|
| EP | 0 060 501 A2 | 9/1982 |

(Continued)

OTHER PUBLICATIONS

French Preliminary Search Report dated Jul. 5, 2017 in French Application 16 60700, filed on Nov. 4, 2016 (with English Translation of Categories of Cited Documents).

*Primary Examiner* — Moshe Wilensky
(74) *Attorney, Agent, or Firm* — Oblon, McClelland, Maier & Neustadt, L.L.P.

(57) ABSTRACT

A method of machining an attachment flange of an aircraft turbomachine case, the method also including a system to machine the two opposite surfaces of the flange, and including a shape follower machining module, this module being designed to follow the shape of the flange and including a first structure equipped with a first machining tool, and a second structure equipped with a second machining tool, the flange fitting between the structures such that its two opposite surfaces are machined by tools, the module also including shape follower elements carried by the structures; and a device to drive movement of the machining module along a circumferential direction of the flange.

7 Claims, 6 Drawing Sheets

(51) Int. Cl.
*B23Q 35/28* (2006.01)
*B23C 3/00* (2006.01)
(52) U.S. Cl.
CPC ...... *F05D 2230/10* (2013.01); *F05D 2230/53* (2013.01); *F05D 2240/14* (2013.01)

(56) References Cited

FOREIGN PATENT DOCUMENTS

| | | |
|---|---|---|
| EP | 3 020 508 A1 | 5/2016 |
| JP | 2007-260836 | 10/2007 |
| WO | WO 2009/147307 A1 | 12/2009 |
| WO | WO 2016/027030 A1 | 2/2016 |

* cited by examiner

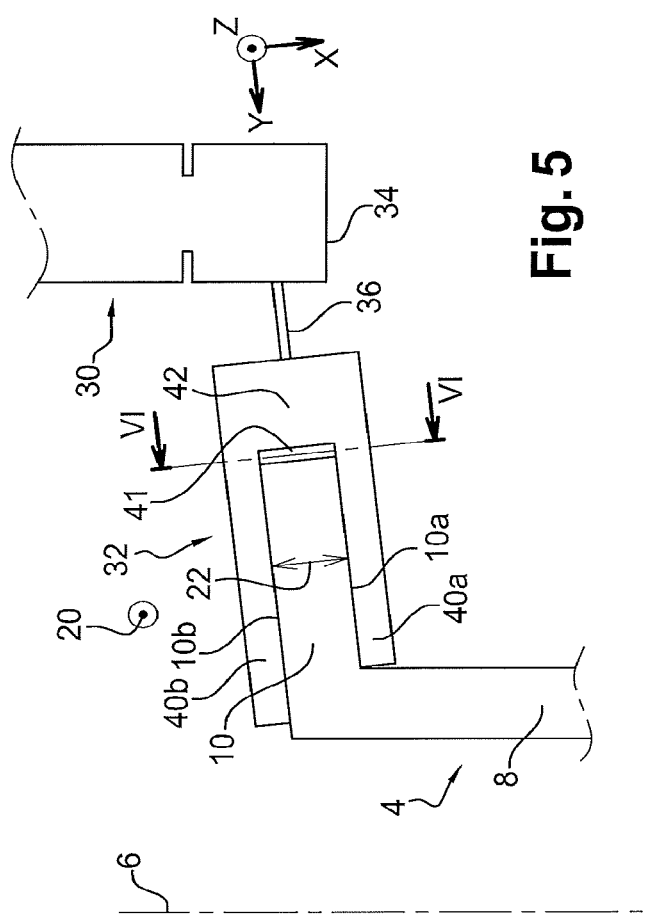
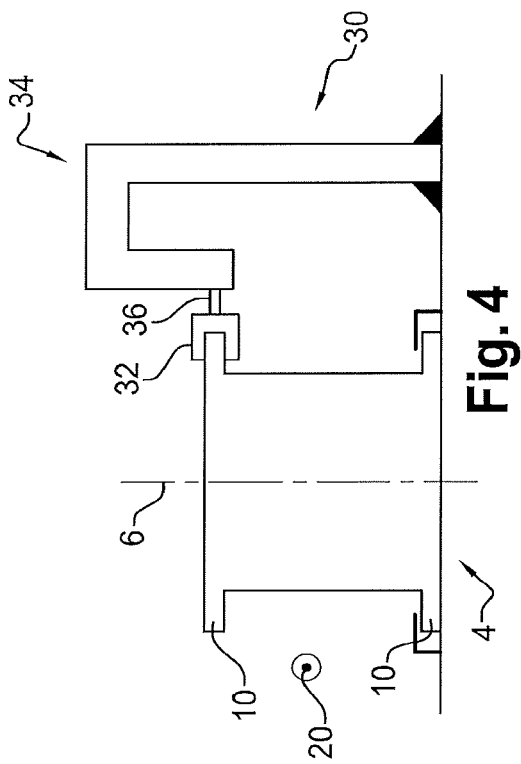
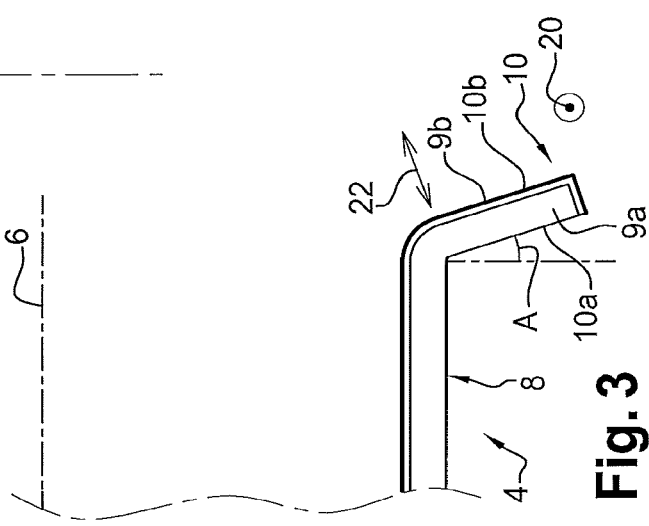
Fig. 5
Fig. 4
Fig. 3

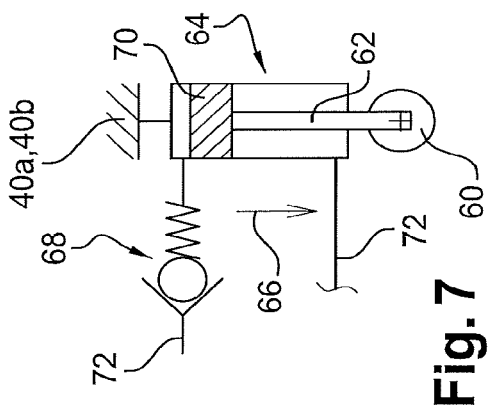
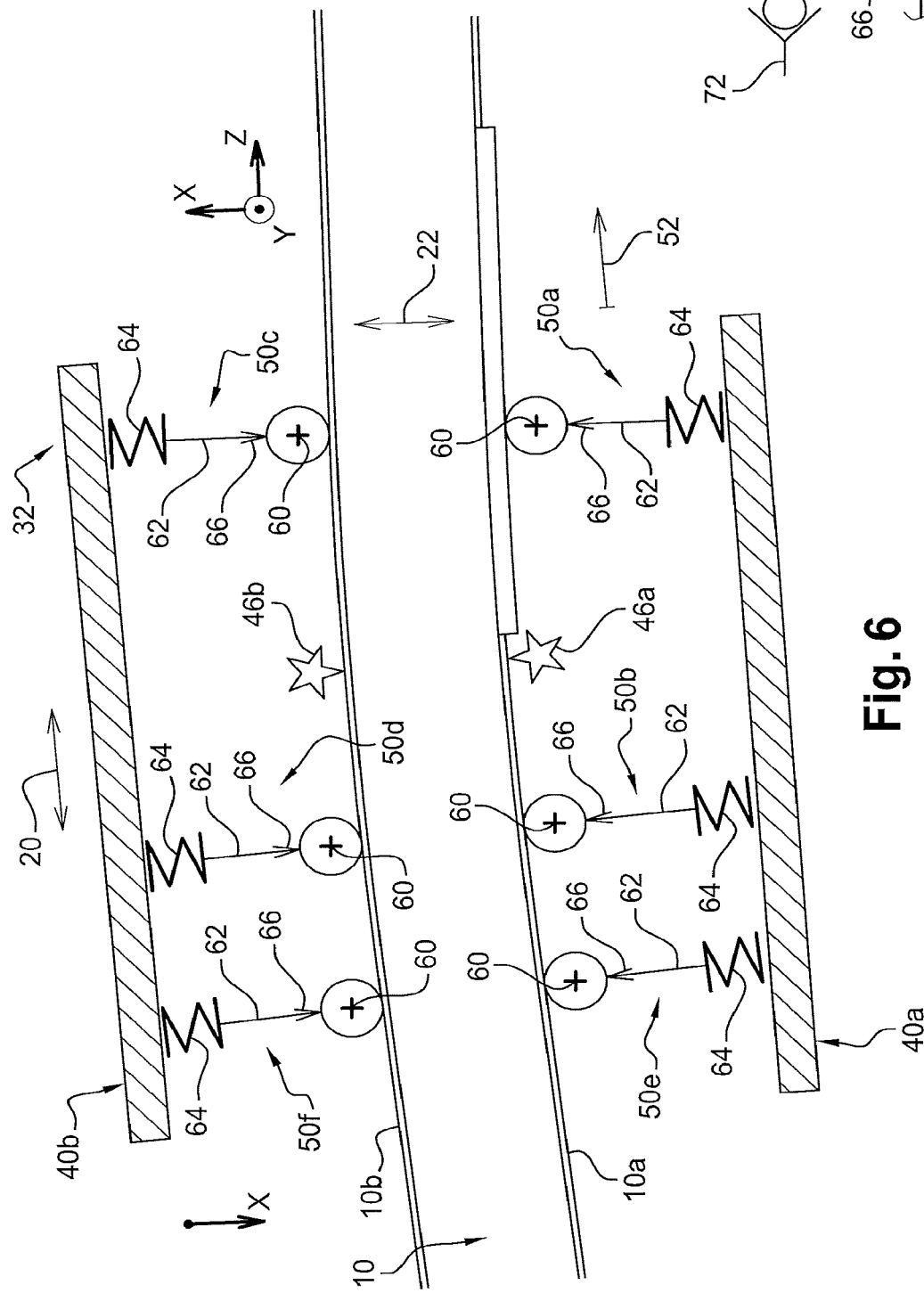
Fig. 6
Fig. 7

METHOD FOR MACHINING AN ATTACHMENT FLANGE OF AN AIRCRAFT TURBOMACHINE CASE

TECHNICAL DOMAIN

This invention relates to the domain of aircraft turbomachines, and more particularly to manufacturing of their cases, such as the fan case. It more specifically concerns the operation to machine a case flange.

STATE OF PRIOR ART

Normally, a turbomachine case comprises a shell at the ends of which there are two attachment flanges, for the mechanical connection of this case to other elements of the turbomachine.

A case flange extends essentially radially outwards, from the shell of the same case. It may include a principal part made of carbon coated with a galvanic protection layer, for example obtained using a stack of several glass layers. The principal part made of carbon assures that the flange has good mechanical strength.

After the rough case part has been obtained, different operations are usually carried out on the attachment flange, such as trimming, surface grinding and drilling holes through which attachment bolts can pass.

Surface grinding of two opposite surfaces of each flange consists of machining done in order to adjust the flange thickness and the length of the case. In general, a machine tool brings a cutting tool to be displaced into the plane of each surface of the flange, to remove the required quantity of material.

However, the flange provided on the rough part to be machined is not always perfectly plane, since it does not have to be for correct assembly of the case on the adjacent turbomachine element. Any planeness defect of the flange can be corrected during assembly, due to the intrinsic flexibility of the flange. On the other hand, these planeness defects of the flange can create fabrication problems, since due to these defects, the quantity of material to be removed is not the same along the entire surface of the flange. In the most critical cases, it is even possible that the entire galvanic protection layer is eliminated in some locations.

Consequently, the thickness of carbon and the thickness of galvanic protection have to be oversized, to be sure that the minimum thicknesses of carbon and galvanic protection remain at all points on the flange after surface grinding of the two plane surfaces of the flange. These oversizes obviously have an impact on the initial global mass and production costs, and increase the quantity of material to be removed from the rough part by machining.

If there is not sufficient oversizing, there is a risk that the two plane surface grindings of the flange will cause one or several defective zones along the circumferential direction of the flange, zones in which the thickness of carbon is no longer sufficient to maintain satisfactory mechanical strength, and/or in which the glass coating is missing or is not sufficient to confer good galvanic protection.

Moreover, it is noted that the problem presented above occurs not only when the two opposite surfaces of the attachment flange are plane, but also when the flange is slightly inclined relative to a transverse plane of the case, leading to opposite surfaces in the form of truncated cones.

SUMMARY OF THE INVENTION

Therefore, the purpose of the invention is to disclose a solution that at least partially remedies the problems mentioned above, found in solutions according to prior art.

To achieve this, the first purpose of the invention is a method of machining an attachment flange for an aircraft turbomachine case, said method being aimed at machining at least one of the two opposite surfaces of the flange approximately along the direction of its thickness, making use of a machining system comprising a shape follower machining module, this module being intended to follow the shape of the flange when it is moved along the circumferential direction of the flange relative to the axis of the case, the module comprising a first structure fitted with a first machining tool and a second structure fixed to the first structure, the flange being intended to fit between the first and second structures such that said at least one of the two opposite surfaces is machined by the first machining tool, the module also comprising shape follower elements carried by the first and second structures, the method including the following steps:

placement of the machining module on the case attachment flange, with the machining tool(s) and shape follower elements in a retracted position;

bring the machining tool(s) and shape follower elements into contact with opposite surfaces of the flange; and displacement of the machining module along the circumferential direction of the flange, displacement during which the machining module follows the shape of the flange.

The invention thus confers a follower nature on the machining module, so that it can follow the flange to be machined. As a result of this special feature, when the compliant module is moved along the circumferential direction of the flange, it follows any geometric defects on this flange Consequently, risks of excessive removals of material are eliminated and the rough part can be designed without any oversizing, which leads to a reduction of manufacturing costs. Furthermore, the quantity of material removed during machining is also reduced because it becomes approximately constant along the length of the flange, even if there are any geometric defects on it.

Moreover, it is noted that the shape follower machining module can be moved along the circumferential direction in different ways. Regardless of what technique is adopted, this movement does not change the shape follower nature of the module, which implies that the module follows any geometric defects in this flange, particularly along the axial direction. The movement drive along the circumferential direction may be manual, or the module can include motor-driven rollers to advance the work along the flange. According to yet another possibility, the module can be coupled to a movement drive device, for example a machine tool such as a portal-frame type milling machine or a robot.

Preferably, the invention also includes at least one of the following additional characteristics, taken in isolation or in combination.

The machining system is preferably intended to simultaneously machine the two opposite surfaces of the flange, said second structure being fitted with a second machining tool, and the flange being intended to fit between the first and second structures such that its two opposite surfaces are machined by the first and second machining tools respectively.

It should be noted that in the following, the description of the invention is applicable indifferently to the case in which only one of the two faces is machined, and to the other case in which the two opposite faces, preferably parallel, are machined by the module simultaneously.

The machining system also comprises a mechanical coupling device between the machining module and a device to drive the module along the circumferential direction of the flange, the coupling device allowing at least one degree of freedom in translation between the module and the movement drive device, along a direction of separation of the two structures of the machining module corresponding to the direction of the flange thickness. In other words, the machining module and the module movement drive device are decoupled in the axial direction, such that the movement drive device maintains its flange follower nature when it is driven in the circumferential direction along the flange.

Preferably, to further accentuate partial mechanical decoupling between the machining module and the movement drive device, the mechanical coupling device also enables the following between the module and the movement drive device:
- a rotation degree of freedom along a direction of insertion of the flange in an inter-structure space of the machining module, the insertion direction between approximately orthogonal to the separation direction; and
- a rotation degree of freedom along a circumferential direction of the machining module corresponding to the circumferential direction of the flange, the circumferential direction of the module being approximately orthogonal to the direction of separation and the direction of insertion.

Preferably, each of the shape follower elements comprises:
- a bearing element at a distal end of the follower element, said bearing element being designed to come into contact with the flange;
- a support device carrying the bearing element;
- a means of loading the support device, aiming to force this device to move relative to the associated structure, in the direction in which pressure is applied, towards the flange to be machined; and
- a non-return means prohibiting displacement of the support device relative to the associated structure, in the direction opposite to the direction in which said pressure is applied.

The combination of the above-mentioned means can assure satisfactory positioning of the machining module relative to the flange to be machined, during its movement on this flange.

Preferably, the bearing element is a roller or a wheel.

For example, the means of loading the support device is a ram, and the non-return means is a non-return valve.

The follower elements listed below should preferably be provided to improve control over the relative positions of the machine tools and the flange:
- at least one first and one second follower elements carried by the first structure and located on opposite sides of the first machining tool along the circumferential direction; and
- at least one third and one fourth follower elements carried by the second structure and located on opposite sides of the second machining tool along the circumferential direction; and In order to further improve control over the relative position of the machine tools and the flange during movement of the module along the circumferential direction, it is preferably arranged such that the machining module also includes the follower elements listed below:
- at least one fifth follower element supported on the first structure and located either behind or in front of the first and second follower elements, along a direction of advance of the machining module; and
- at least one sixth follower element supported on the second structure and located either behind or in front of the third and fourth follower elements, along the direction of advance of the machining module.

Note that the presence of these fifth and sixth shape follower elements is particularly useful to keep the module in position, when follower elements located directly behind the machining tools pass from an unmachined zone to a machined zone of the rough part.

Preferably, the machining method is designed to machine a fan case attachment flange.

Other advantages and characteristics of the invention will become clear after reading the following detailed non-limitative description.

BRIEF DESCRIPTION OF THE DRAWINGS

This description will be made with reference to the appended drawings among which:

FIG. 3 shows a half-sectional axial view of the case shown in the previous figure;

FIG. 4 shows a diagrammatic front view of a machining system according to the invention, designed to machine the attachment flange of the fan case shown on the previous figures;

FIG. 5 shows an enlarged cross-sectional view of the system shown on the previous figures;

FIG. 6 shows a sectional view along line VI-VI in FIG. 5;

FIG. 7 shows a front view of a shape follower element equipping the machining module shown on the previous figures

DETAILED DESCRIPTION OF PREFERRED EMBODIMENTS

Figure 1:
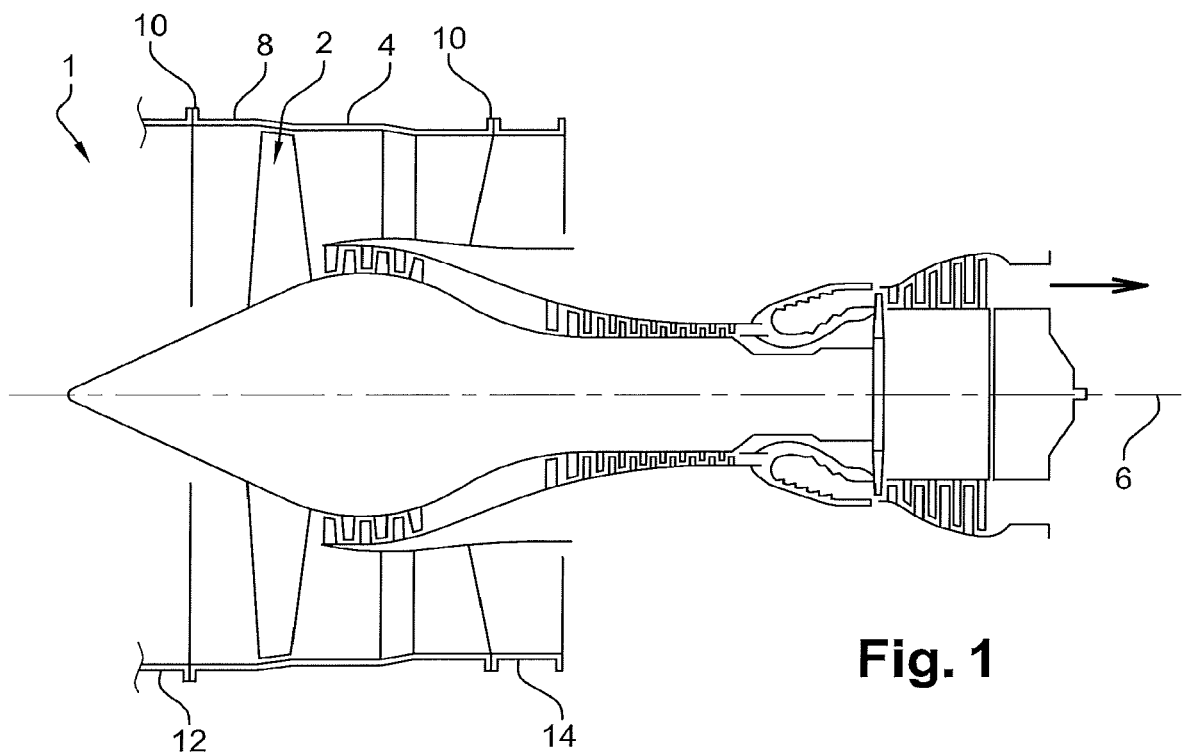
FIG. 1 shows a diagrammatic longitudinal sectional view of an aircraft turbomachine.

With reference firstly to FIG. 1, the figure shows an aircraft turbomachine 1, of the twin-spool turbojet type. This turbojet 1 is equipped with a fan 2 surrounded by fan case 4, centred on the longitudinal axis 6 of the turbojet. In a known manner, the fan case 4 comprises a shell 8 supporting two attachment flanges 10 at its ends. These flanges are used for mechanical connection with adjacent elements of the turbojet, normally an air intake 12 and an external shell 14 of an intermediate case.

Figure 2:
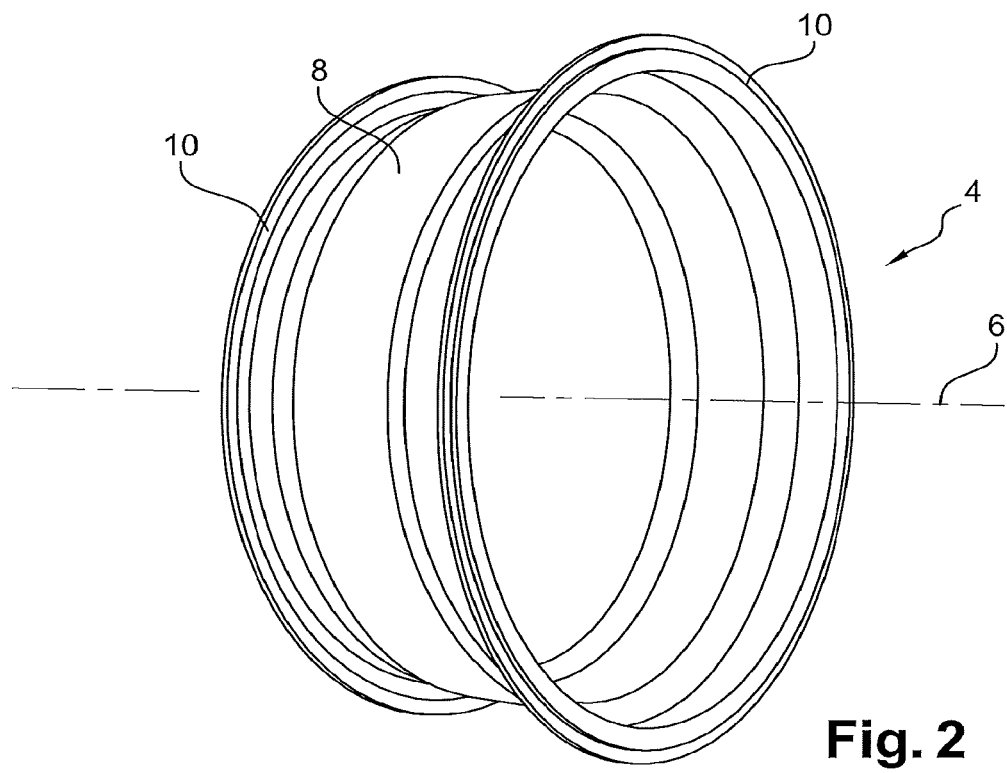
FIG. 2 shows an enlarged perspective view of a turbomachine fan case shown on the previous figure.
Figure 8:
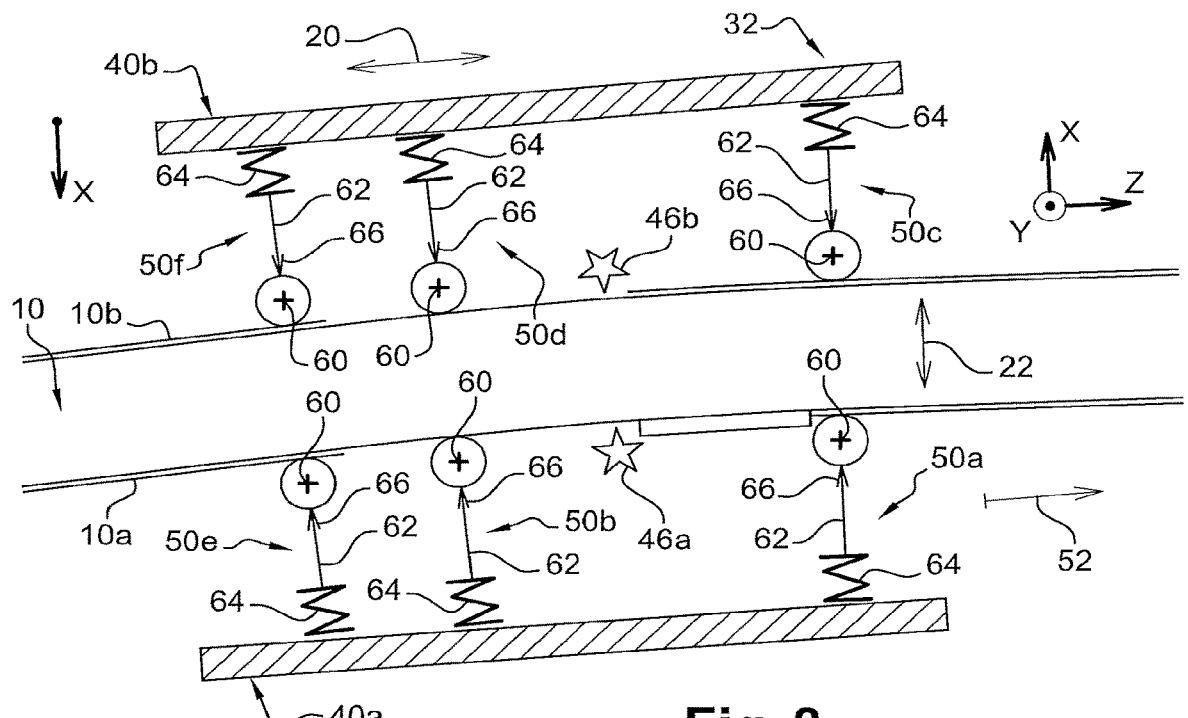
FIGS. 8 to 11 are views similar to FIG. 6 representing successive states of a machining module of the machining system, during its displacement along the flange of the casing while it is being machined.
Figure 9:
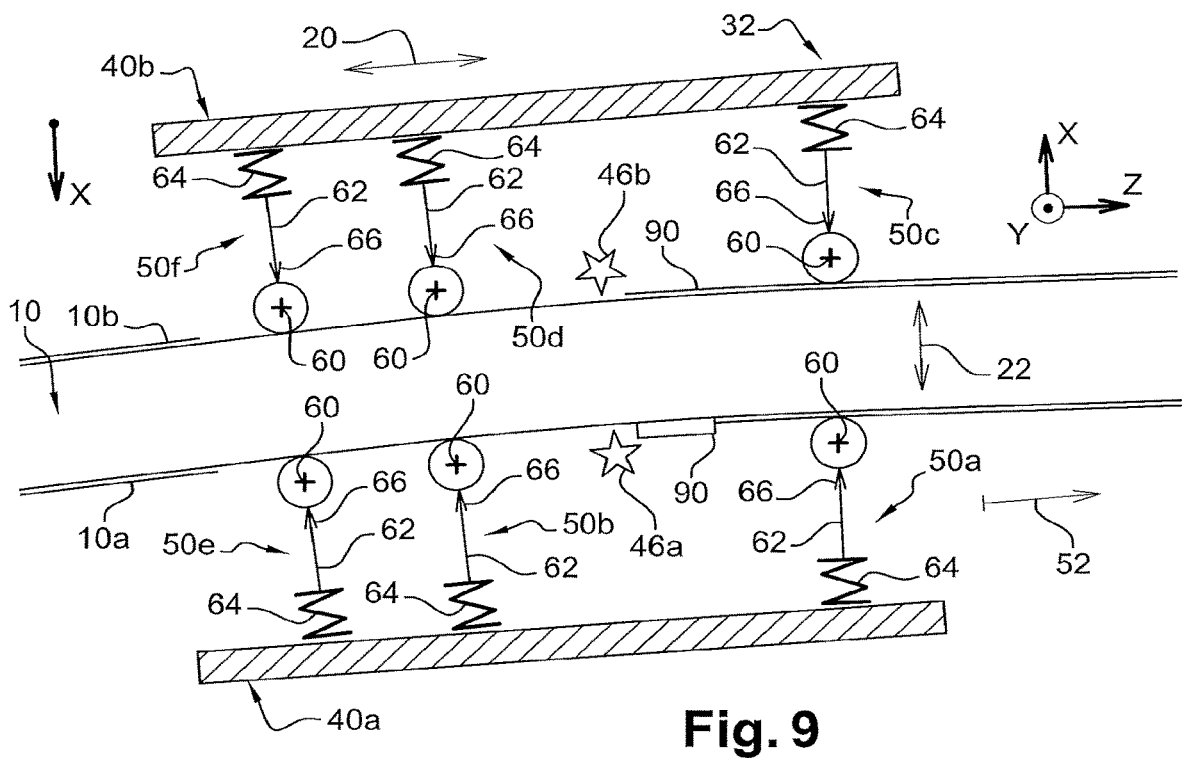

With reference to FIGS. 2 and 3, it can be seen that the two attachment flanges 10 extend essentially in the radially outwards direction from the shell 8. The flanges 10 can be inscribed in the transverse planes of the case 4, or they can be in the form of a truncated cone as shown diagrammatically on FIG. 3. In this case, there is an angle A between the normal to the shell 8 and the attachment flange, as seen in an axial half-section. This angle is normally small, for example a few degrees, and is preferably less than one degree.

In the remainder of this description, reference will be made to one of two attachment flanges 10, but it is understood that the invention is similarly applicable for machining two flanges. The flange 10, that extends in an approximately annular manner around the longitudinal axis 6, comprises a principal part 9a made of carbon, for example corresponding to the folded end of a stack of carbon layers forming the shell 8. The principal part 9a made of carbon assures that the flange has good mechanical strength. It is coated with a galvanic protection layer 9b, for example obtained using a stack of several glass layers. The thickness of the principal part 9a may for example be of the order of 15 mm, while the thickness of the galvanic protection layer 9b may for example be of the order of 2 mm.

The thickness of the attachment flange 10 along a direction 22 called the flange thickness direction is approximately constant around the entire circumferential direction 20 of the flange. The direction 22 is approximately parallel to the longitudinal axis of the turbomachine. The flange thus has two opposite surfaces along the direction of the thickness 22, namely a first surface 10a made of carbon and a second surface 10b made of glass.

The invention includes a particular system 30 and a particular method to simultaneously machine the two surfaces 10a, 10b of the flange, in its state as a rough part obtained after baking the composite assembly. The machining system 30 will now be described with reference to FIGS. 4 to 7.

It globally includes three major parts, namely a machining module 32 that will cooperate with the flange, a device 34 to drive movement of the module 32 along the circumferential direction 20, and a mechanical coupling device 36 between the module 32 and the movement drive device 34. As can be seen for example on FIG. 5, the machining module 32 comprises a body formed by first and second parallel structures 40a, 40b fixed to each other, defining an inter-structure space 41 between them, inside which the flange 10 will fit. The two structures 40a, 40b are connected to each other at their ends by a base 42, such that the body is in the general shape of a U.

The movement drive device 34 may be conventional, for example a portal-frame type of milling machine tool comprising a spindle, the head of which will support the module 32 through the coupling device 36, or an articulated robot. In all cases, the movement drive device 34 is capable of moving the module 32 along the circumferential direction 20, around the entire flange 10.

However, the device 36 is deliberately designed to provide only partial mechanical coupling between the module 32 and the movement drive device 34. Coupling with several degrees of freedom is provided such that the machining module 24 will follow the shape of the flange that it is designed to machine, and its trajectory is thus not dictated only by the device 34. In this respect, note that three directions are associated with the module 32, these three directions that are orthogonal to each other forming a right-handed system. There is firstly an X direction of separation between the two structures 40a, 40b of the module 32, this X direction also corresponding to the direction 22 of the flange thickness. There is then a Y direction along which the flange is inserted into the inter-structure space 41, this direction 41 being approximately parallel to the structures 40a, 40b. Finally, there is a circumferential direction Z of the machining module that is the circumferential direction 20 of the flange 10 about the axis of the case. The X, Y and Z directions are approximately orthogonal to each other.

Mechanical decoupling between the module 32 and the movement drive device 34 is thus achieved at the device 36, so as to simultaneously authorise:
- a degree of freedom in translation along the separation direction X;
- a degree of freedom in rotation along the insertion direction Y; and
- a degree of freedom in rotation along the circumferential direction Z.

With this embodiment, the machining module 32 is driven essentially by the device 34 along the circumferential direction 20 of the flange. If there are any geometric defects on the flange, the degrees of freedom of movement mentioned above will enable the module 32 to make parasite movements such that these defects can be followed.

We will describe equipment provided on the machining module 32, with reference more specifically to FIG. 6. Firstly, the first structure 40a is equipped with a first machining tool 46a, for example a rotating surface grinding tool. This tool 46a is driven in rotation by the device 34, or by an independent motor drive. There are first and second follower elements 50a, 50b carried by the first structure 40a, on each side of the first machining tool 46a along the circumferential direction 20. The first element 50a is located in front of the tool 46a along a direction of advance of the machining module, represented by the arrow 52. Furthermore, a fifth follower element 50e is also provided carried by the first structure 40a, located behind the second follower element 50b, still along the direction of advance of the module 52.

Similarly, the second structure 40b is equipped with a second machining tool 46b, for example a rotating surface grinding tool. This tool 46b is also driven in rotation by the device 34, or by an independent motor drive. There are third and fourth follower elements 50c, 50d carried by the second structure 40b, on each side of the second tool 46b along the circumferential direction 20. The third element 50c is located in front of the tool 46b along the direction of advance 52 of the module. Furthermore, a sixth follower element 50f is also provided, also carried by the second structure 40b, and located behind the fourth follower element 50b, still along the direction of advance of the module 52.

The shape follower elements 50a-50f face each other in pairs along the X direction, and the two tools 46a, 46b face each other along this same X direction.

Each shape follower element comprises firstly a bearing element 60 arranged at a distal end of the follower element. It is preferably a roller 60, with its axis orthogonal to the circumferential direction 20. During machining, the roller 60 contacts the flange 10 at one of its two opposite surfaces 10a, 10b. The follower element also comprises a support device 62 supporting the roller 60, and coupled to loading means 64. This means 64 is configured to force the support device 62 to move relative to its associated structure 40a, 40b, along a direction 66 in which pressure is applied, towards the flange to be machined.

Each follower element 50a, 50f also comprises a non-return means preventing displacement of the support device 62 relative to the associated structure 40a, 40b, in the direction opposite to the direction 66 in which pressure is applied. This non-return means may be integrated into the design of the loading means 64, or it may be an independent element. In the example shown on FIG. 7, the means 64 of loading the support device is a ram, with this support device composed of or forming part of the ram rod. The ram 64 is thus supplied with and controlled by fluid on each side of the piston 70, so as to apply the required pressure along the direction of the pressure 66. The non-return nature is obtained by means of a non-return valve 68 located on one of the supplies 72, such that the pressure in the chambers of the ram prevent the rod 62 from moving along the direction opposite to the direction 66 in which pressure is applied.

FIGS. 6 and 8 to 11 diagrammatically show a method of machining the attachment flange 10, using the machining system 30 that has just been described.

The first step is to place the machining module 32 on the case attachment flange, with the machining tools 46*a*, 46*b* and the shape follower elements 50*a*-50*f* arranged in a retracted position to avoid hindering this insertion. Once the flange has been introduced into the inter-structure space of the machining module, the machining tools 46*a*, 46*b* and the shape follower elements 50*a*-50*f* are brought into contact with the opposite surfaces 10*a*, 10*b* of the flange. This state that occurs before the module 32 is moved along the circumferential direction 20, is shown diagrammatically on FIG. 6. Before displacement of the tools 46*a*, 46*b* towards the flange surfaces 10*a*, 10*b*, these tools are made to rotate, after the follower elements have been brought into contact with their corresponding surfaces, and then locked in the direction opposite to the direction in which pressure is applied to the flange.

Tools are moved towards the above-mentioned surfaces such that each is brought into a position to obtain the required cutting/surface grinding thickness. These specific positions of tools 46*a*, 46*b* relative to structures 40*a*, 40*b* of the module are then kept throughout the flange machining period.

The next step is to move the machining module 32 along the circumferential direction 20, along the advance direction 52. This movement is made using the movement drive device, as described above.

At the beginning of this movement, the six shape follower elements 50*a*-50*f* roll on the unmachined portions of the rough part. However, the second and fourth follower elements 50*b*, 50*d* quickly reach a zone that has been machine by the tools 46*a*, 46*b*, further forwards. When each element 50*b*, 50*d* is located facing the machined zone of the flange, its loading means 64 act automatically to compensate for the clearance created between the unmachined and the machined zones. During displacement of these shape follower elements, the module 32 is held in the right position relative to the flange 10 by the fifth and sixth shape follower elements 50*e*, 50*f*, that remain in contact with the unmachined zones. The movement of the module 32 along the circumferential direction continues after this critical phase, as shown diagrammatically on FIG. 8. It is then the turn of the fifth and sixth elements 50*e*, 50*f* to pass from the unmachined zone to the machined zone, still under the action of their loading means 64. Once again, there is no problem in keeping the module 32 in the right position during the transition, since this module remains held in position by the first four follower elements 50*a*-50*d*. The phase after this transition is shown diagrammatically in FIG. 9.

Figure 10:
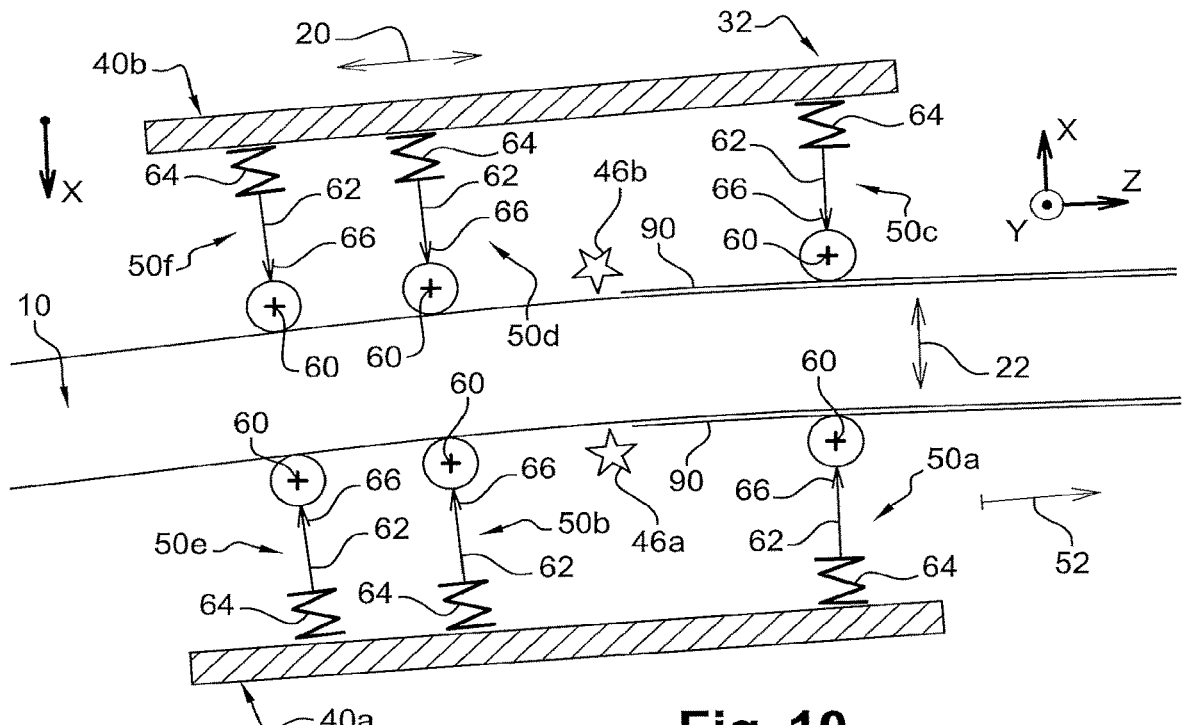
Figure 11:
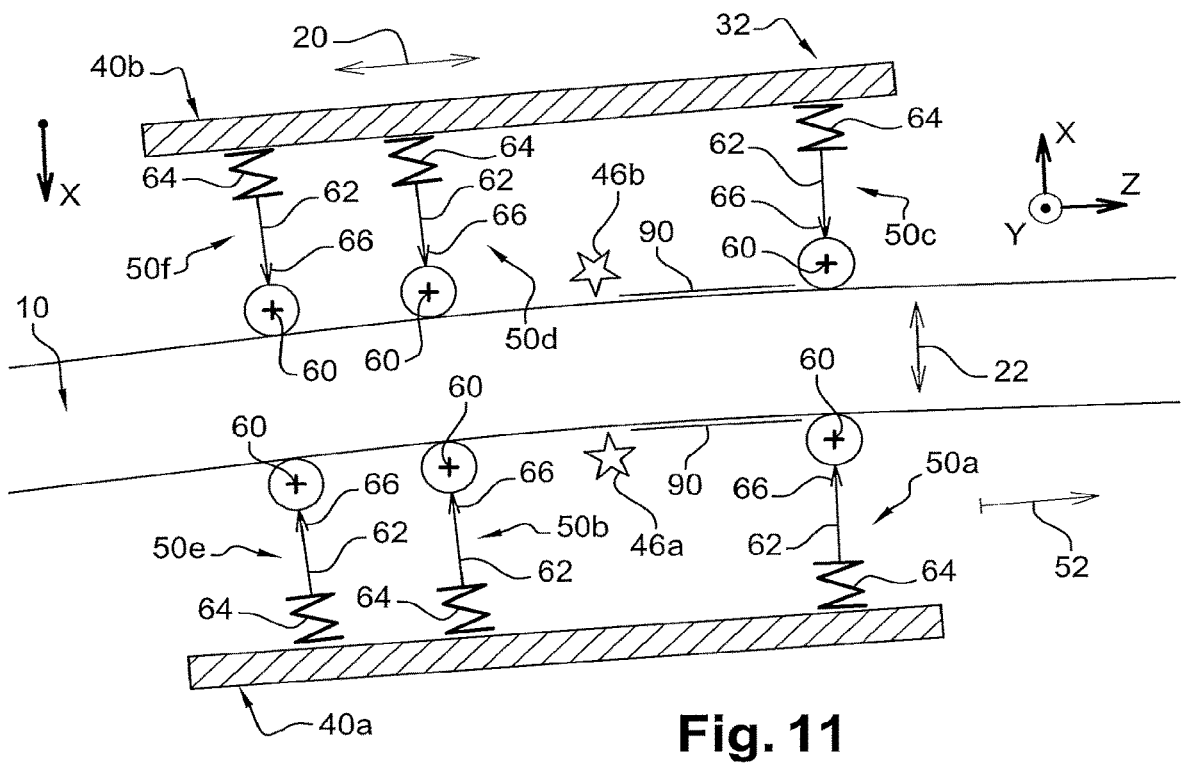

Movement then continues along the circumferential direction 20, as shown on FIGS. 10 and 11, until the two surfaces 10*a*, 10*b* of the flange have been completely machined. During this machining, unwanted overthicknesses 90 are removed from each of the two surfaces 10*a*, 10*b*. The residual thickness of the flange thus remains approximately constant along its entire length, this thickness corresponding to the separation distance between the tools 46*a*, 46*b*.

Figure 12:
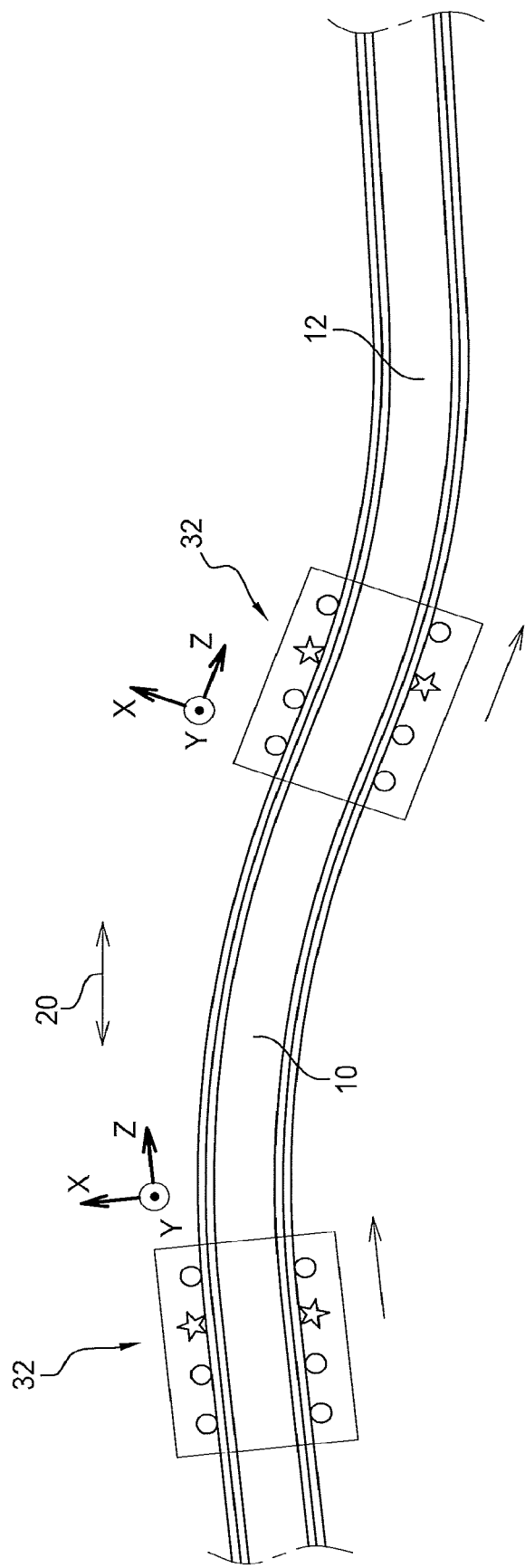
FIG. 12 is a diagrammatic view taken radially from the outside, diagrammatically showing the follower nature of the machining module while the flange is being machined.

Finally, it is noted that during displacement of the module 32 along the circumferential direction, the module follows the shape of the flange 32, including any geometric defects on the flange, due to mechanical decoupling using the partial coupling device. This feature that is specific to this invention corresponds to the follower nature attached to the module 32, and is shown diagrammatically on FIG. 12, on which the amplitude of the geometric defects has been deliberately exaggerated to facilitate understanding. This follower nature can assure that the module 32 always remains correctly positioned relative to the flange 10, particularly remaining centred relative to the flange such that removal of material is correctly distributed between the two opposite surfaces 10*a*, 10*b* to be machined.

Obviously, an expert in the subject can make various modifications to the invention as it has just been described solely through non-limitative examples. In particular, the system is capable of machining only one of the two opposite surfaces of the flange. Furthermore, the movement drive device could be replaced by a manual displacement, or by a system directly on board the machining module, such as motor-driven rollers.

The invention claimed is:

1. A method of machining an attachment flange for an aircraft turbomachine case, said method being for simultaneously machining two opposite surfaces of the flange approximately along the direction of its thickness, making use of a machining system comprising a machining module, the machining module being intended to follow the shape of the flange when it is moved along the circumferential direction relative to the axis of the case, the machining module comprising a first structure fitted with a first machining tool and a second structure fitted with a second machining tool and fixed to the first structure, the flange being intended to be fit between the first and second structures such that the two opposite surfaces are machined by the first and second machining tools, the machining module also comprising shape follower elements carried by the first and second structures, the method including the following steps:

placing the machining module on the case attachment flange, with the first and second machining tools and shape follower elements in a retracted position;

bringing the first and second machining tools and shape follower elements into contact with opposite surfaces of the flange; and displacing the machining module along the circumferential direction of the flange, displacement during which the machining module follows the shape of the flange, wherein the flange is configured to fit between the first and second structures such that the two opposite surfaces of the flange are machined by the first and second machining tools respectively, wherein the machining module comprises the follower elements listed below:

at least one first and one second follower elements carried by the first structure and located on opposite sides of the first machining tool along the circumferential direction; and at least one third and one fourth follower elements carried by the second structure and located on opposite sides of the second machining tool along the circumferential direction.

2. The machining method according to claim 1, further comprising a step of machining an attachment flange of a fan case.

3. The method according to claim 1, wherein the machining system used for the step of displacing the machining module also comprises a mechanical coupling device between the machining module and a device to drive the machining module along the circumferential direction of the flange, the coupling device allowing at least one degree of freedom in translation between the machining module and the movement drive device, along a direction of separation of the two structures of the machining module corresponding to the direction of the flange thickness.

4. The method according to claim 3, wherein the mechanical coupling device also allows the following, between the machining module and the movement drive device:
- a rotation degree of freedom along a direction of insertion of the flange in an inter-structure space of the machining module, the insertion direction being approximately orthogonal to the separation direction; and
- a rotation degree of freedom along a circumferential direction of the machining module corresponding to the circumferential direction of the flange, the circumferential direction of the machining module being approximately orthogonal to the direction of separation and the direction of insertion.

5. The method according to claim 1, wherein each of the shape followers comprises:
- a bearing element at a distal end of the follower element, said bearing element being designed to come into contact with the flange;
- a support device carrying the bearing element;
- a means of loading the support device, aiming to force the support device to move relative to the associated structure, in a direction in which pressure is applied, towards the flange to be machined; and
- a non-return means prohibiting displacement of the support device relative to the associated structure, in the direction opposite to the direction in which said pressure is applied.

6. The method according to claim 5, wherein the means of loading the support device is a ram, and the non-return means is a non-return valve.

7. The method according to claim 1, wherein the machining module also comprises the follower elements listed below:
- at least one fifth follower element supported on the first structure and located either behind or in front of the first and second follower elements, along a direction of advance of the machining module; and
- at least one sixth follower element supported on the second structure and located either behind or in front of the third and fourth follower elements, along the direction of advance of the machining module.

* * * * *